UNITED STATES PATENT OFFICE 2,673,842

DETERGENT COMPOSITIONS

Earl L. Brown, Dayton, Ohio, assignor to Monsanto Chemical Company, St. Louis, Mo., a corporation of Delaware No Drawing. Application May 24, 1951, Serial No. 228,110

7 Claims. (Cl. 252—152)

The present invention relates to surface active agents and deals more particularly with compositions having very good lathering properties in the presence or absence of oleaginous materials.

In the copending application of Milton Kosmin, Serial No. 179,384, dated August 14, 1950, now Patent No. 2,647,913, issued August 4, 1953, there are disclosed sulfates of polyglycol ethers of 2-butyloctanol-1. These products are prepared by condensing ethylene oxide with the alcohol and converting the resulting hydroxyethers to alkali metal or ammonium sulfates. While these products show very good detersive and wetting out properties they have been found to be somewhat deficient in lathering properties, particularly when solutions of the products are employed as liquid detergents to be used for dishwashing purposes. Liquid detergents for such uses should possess the property of giving good lathers both in the presence or absence of the fats and oils which accumulate in dishwater.

Now I have found that when alkali metal or ammonium sulfates of the 2-butyloctanol-1 polyglycol ethers are mixed in varying proportions with alkali metal or ammonium salts of N-alkyltaurines in which the alkyl radical has 12 carbon atoms, the resulting mixtures exhibit a marked superiority in lathering properties over either constituent when employed alone. The synergistic effect of the N-alkyltaurines on the sulfated 2-butyloctanol-1 polyglycols is evident when the mixture consists of from 10% to 90% by weight of the taurine compound and from 90% to 10% by weight of the polyglycol compound. Thus while tests of the butyloctanol compound alone give a lathering value of 145 for 0.12% aqueous solutions thereof, a 17:83 taurine compound-butyloctanol compound mixture gives a lathering value of 175 when evaluated by the same test method in the same concentration; and an 83:17 taurine compound-butyloctanol compound mixture has a lathering value of 200. Whereas the taurine compound, alone, possesses very good lathering properties when used in the absence of oils, the lathering thereof is markedly decreased in the presence of oils. A housewife, noting the decrease in lather during the dishwashing process when employing a detergent containing only the taurine compound as the active ingredient, would be tempted either to add more of the detergent to the dishwater, thereby employing a wasteful amount of the same, or to replace it with a detergent possessing good lathering properties in the presence or absence of oils, fats and greases.

Sulfated polyglycol ethers of 2-butyloctanol-1 which I employ with the present N-alkyltaurine compounds to yield mixtures possessing improved lathering properties have the formula:

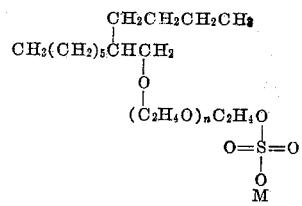

in which $n$ is an integer having a value of from 2 to 4 and M is selected from the class consisting of alkali metal and ammonium. As illustrative of compounds having the above formula may be mentioned the sodium salt of sulfated triethylene glycol ether of 2-butyloctanol-1, the potassium salt of sulfated tetraethylene glycol ether of 2-butyloctanol-1, the ammonium salt of pentaethylene glycol ether of 2-butyloctanol-1, etc. They are prepared by reacting one mole of 2-butyloctanol-1 with from 3 to 5 moles of ethylene oxide to give the tri-, tetra- or pentaethylene glycol ether of 2-butyloctanol, treating the latter with a sulfating agent such as sulfuric acid or sulfur trioxide, and neutralizing the resulting sulfated product with an alkali metal or ammonium hydroxide or a basic reacting salt thereof.

The N-alkyltaurine compounds which I mix with the above salts of sulfated polyglycol ethers of 2-butyloctanol-1 have the formula

in which R is an alkyl radical having 12 carbon atoms and M is selected from the class consisting of alkali metal and ammonium. Examples of compounds useful for the present purpose include the sodium, potassium, lithium or ammonium salts of N-n-dodecyltaurine, of N-tert-dodecyltaurine and of N-alkyltaurines in which the alkyl radical is derived from a kerosene fraction containing a preponderance of $C_{12}$ paraffins or from the mixture of $C_{12}$ alcohols present in hydrogenated coconut oil fatty acids. Advantageously the N-alkyltaurines may be prepared by the process described in the copending application of Milton Kosmin, Serial No. 226,948, filed May 17, 1951.

The invention is further illustrated, but not limited, by the following examples.

Example 1

The lathering properties of surface-active agents may be evaluated by employing various tests; in order to best reproduce conditions of dishwashing operations the following mechanical stirring method was used, employing the apparatus and procedure described below:

APPARATUS

*Stirrer.*—The rounded metal propeller dual blades had a combined length of 3.7 cm. from tip to tip and were centrally located on a shaft 5 mm. in diameter. The blades were 11 mm. wide and were set at an angle approximately 35° to the horizontal. The blades were 1 mm. thick.

*Stirrer motor.*—This was a 110 volt laboratory electric stirrer. To maintain a constant speed the stirrer was controlled by a Variac set at 116 dial reading and connected through a Sola constant voltage transformer. The speed of rotation (stroboscope) was 1550 R. P. M.

*Graduate.*—The graduate had the following dimensions:

Inside diameter—6 cm.
Height—21 cm. (from 0 to 600 ml. volume height).

*Water bath.*—A constant temperature was attained by suspending the shortened graduate in a 3000 ml. beaker to which distilled water was added as required to maintain the volume with reference to the graduate at the 200 ml. mark.

PROCEDURE 0.12% solutions of the products to be tested in water of 300 p. p. m. hardness were prepared, as well as solutions of the same concentration in water of 300 p. p. m. hardness containing 10% by weight of Wesson oil.

100 ml. samples of the solutions were transferred to the graduate and brought to temperature.

A temperature of 120 ± 2° F. was maintained. The stirrer was lowered to a height of 13 mm. above the inside bottom of the graduate.

When temperature was attained, the stirrer was started.

The solution was stirred for 30 seconds. At the end of a 30 second rest period the lather volume was recorded in mls. above the 100 ml. mark. Agitation was again continued for 30 seconds, and volume of lather again recorded after aging for 30 seconds. This was continued until 2½ minutes of stirring had been given.

The reproducibility of this method appeared to be ±5 ml.

Employing the above testing method the following results were obtained with mixtures of the sodium salt of sulfated triethylene glycol ether of 2-butyloctanol-1 (Compound I) and the sodium salt of N-n-dodecyltaurine (Compound II) in the indicated proportions.

| Mixture Tested | | Lather Height, cms. | |
|---|---|---|---|
| Weight Percent, Compd. I | Weight Percent, Compd. II | In Absence of Oil | In Presence of Wesson Oil |
| 33 | 67 | 195 | 165 |
| 50 | 50 | 190 | 190 |
| 67 | 33 | 185 | 190 |
| 83 | 17 | 175 | 200 |

Similar testing of Compound I, alone, gave a lather height of only 145 cms. in absence of the oil; and of Compound II, a lather height of 150 in presence of the oil.

Example 2

The unique efficiency of the present sulfated glycols as compared to sulfated glycols derived from alcohols other than 2-butyloctanol-1 was determined by testing 50-50 mixtures of the sodium salt of N-n-dodecyltaurine with the compounds shown below. Employing the testing procedure described in Example I, the following results were obtained.

| Polyglycol Compd. used in 50:50 Mixture | Lather Heights (cms.) | |
|---|---|---|
| | In Absence of Oil | In Presence of Oil |
| Na Salt of sulfated pentaethylene glycol ether of nonanol | 200 | 115 |
| Na Salt of sulfated pentaethylene glycol ether of trimethylnonanol | 95 | 115 |
| Na Salt of sulfated pentaethylene glycol ether of Lorol [1] | 190 | 75 |
| Na Salt of sulfated tetraethylene glycol ether of tridecyl alcohol | 145 | 90 |
| Na Salt of sulfated pentaethylene glycol ether of tetradecyl alcohol | 65 | 45 |

[1] A mixture of $C_{12}$-$C_{13}$ alcohols obtained by hydrogenation of coconut oil fatty acids.

Example 3

This example shows the effect of varying the nature of the alkyl radical in the N-alkyltaurine components. 50-50 mixtures of the sodium salt of sulfated 2-butyloctanol-1 and the isethionate compound shown below were tested by the procedure of Example 1. The following results were obtained:

| Taurine | Lather Heights (cms.) | |
|---|---|---|
| | In Absence of Oil | In Presence of Oil |
| Na salt of N-n-octyltaurine | 50 | 65 |
| Na salt of N-n-dodecyltaurine | 190 | 180 |
| Na salt of N-n-tetradecyltaurine | 115 | 110 |

The very good lathering properties of mixtures of N-alkyltaurines and salts of sulfated polyglycol ethers is thus seen to be a function of the number of carbon atoms in the alkyl radical of the taurine compound as well as of the nature of the alcohol from which the sulfated polyglycol ether is derived; i. e., uniformly high lathering in the presence or absence of oils is a unique property only of a mixture of an alkali metal or ammonium sulfates of the tri-, tetra- or pentaethylene glycol ether of 2-butyloctanol-1 and a like salt of an N-alkyltaurine in which the alkyl radical has 12 carbon atoms. Such mixtures are characterized not only by the outstanding detersive properties which are characteristic of the individual components, but also by lathering properties which are superior to that of either component when used alone.

What I claim is:

1. A surface-active composition consisting of from 10 per cent to 90 per cent, based on the total weight of the composition, of a taurine derivative having the general formula $RNHCH_2CH_2SO_3M$ in which R is an alkyl radical of 12 carbon atoms and M is selected from the class consisting of alkali metal and ammonium; and from 90% to 10%, based on the total weight of the composition of a polyglycol derivative having the general formula

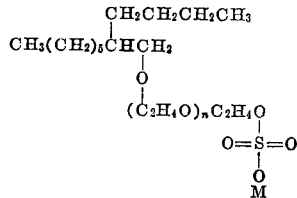

in which $n$ is an integer having a value of from 2 to 4 and M is selected from the class consisting of alkali metal and ammonium.

2. A surface-active composition consisting of about 50%, based on the total weight of the composition, of a taurine derivative having the general formula $RNHCH_2CH_2SO_3M$ in which R is an alkyl radical of 12 carbon atoms and M is selected from the class consisting of alkali metal and ammonium; and about 50%, based on the weight of the total composition, of a polyglycol derivative having the general formula

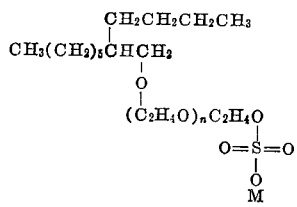

in which $n$ is an integer having a value of from 2 to 4 and M is selected from the class consisting of alkali metal and ammonium.

3. A liquid detergent comprising an aqueous solution of a composition consisting of from 10% to 90%, based on the total weight of the composition, of a taurine derivative having the general formula $RNHCH_2CH_2SO_3M$ in which R is an alkyl radical of 12 carbon atoms and M is selected from the class consisting of alkali metal and ammonium; and from 90% to 10%, based on the total weight of the composition, of a polyglycol derivative having the general formula

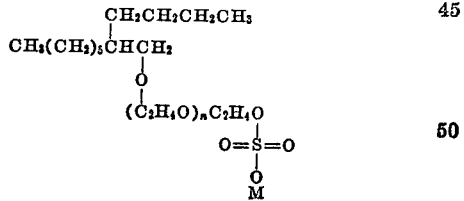

in which $n$ is an integer having a value of from 2 to 4 and M is selected from the class consisting of alkali metal and ammonium.

4. A surface-active composition consisting of from 10% to 90%, based on the total weight of the composition, of the sodium salt of N-dodecyltaurine and from 90% to 10%, based on the total weight of the composition, of the sodium salt of sulfated triethylene glycol ether of 2-butyloctanol-1.

5. A surface-active composition consisting of about 50%, based on the total weight of the composition, of the sodium salt of N-dodecyltaurine and 50%, based on the total weight of the composition, of the sodium salt of sulfated triethylene glycol ether of 2-butyloctanol-1.

6. A liquid detergent comprising an aqueous solution of a composition consisting of from 10% to 90%, based on the total weight of the composition, of the sodium salt of N-dodecyltaurine and from 90% to 10%, based on the total weight of the composition, of the sodium salt of sulfated triethylene glycol ether of 2-butyloctanol-1.

7. A liquid detergent comprising an aqueous solution of a composition consisting of 50%, based on the total weight of the composition, of the sodium salt of N-dodecyltaurine and 50%, based on the total weight of the composition, of the sodium salt of sulfated triethylene glycol ether 2-butyloctanol-1.

EARL L. BROWN.

References Cited in the file of this patent

UNITED STATES PATENTS

| Number | Name | Date |
|---|---|---|
| 1,944,300 | Ott | Jan. 23, 1934 |
| 2,156,996 | Martin | May 2, 1939 |
| 2,174,762 | Schuette | Oct. 3, 1939 |